Dec. 10, 1929.  H. NEWBOLD  1,738,606
SPECTACLES OR THE LIKE
Filed Dec. 22, 1926
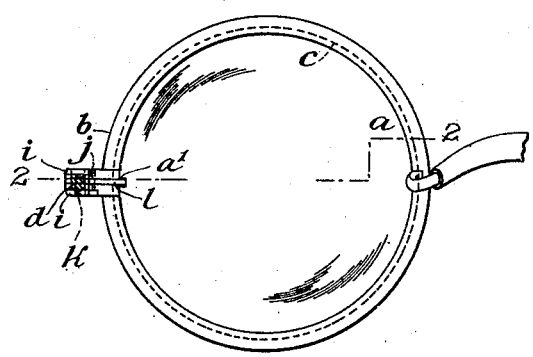
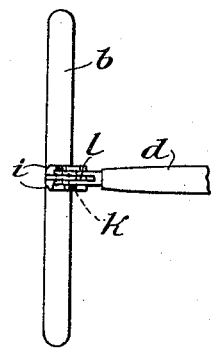
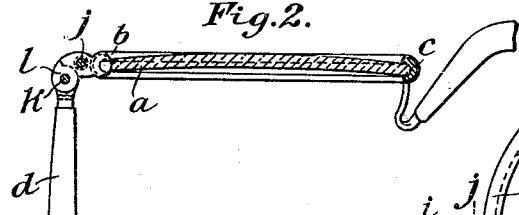
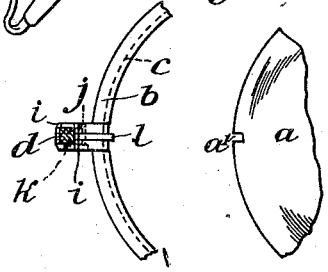
Inventor.
Harry Newbold
By Louis Wood Whitaker
Atty Patented Dec. 10, 1929

1,738,606

UNITED STATES PATENT OFFICE

HARRY NEWBOLD, OF LONDON, ENGLAND

SPECTACLES OR THE LIKE

Application filed December 22, 1926, Serial No. 156,307, and in Great Britain May 5, 1926.

This invention relates to improvements in or connected with spectacles or the like and more particularly those made of tortoise-shell and like material, and having split knuckle joints and plates therein engaging with notches in cylindrical or compound lenses of circular form, to prevent them from creeping or revolving in their eye-wires or frames.

According to the invention, I provide a metallic plate or member of the kind referred to, which is inserted between two sections or end or joint pieces of the knuckle joint formed by the adjacent or meeting ends of the spectacle frame and secured by a screw and extended to receive and engage with the hinge pin or screw of the temple and to form part of the hinge joint for the latter.

The temple is advantageously bifurcated to engage with the said plate.

A joint constructed as described is practically indistinguishable when screwed together, from the known type of solid split-knuckle joint, and it also provides in conjunction with the bifurcation of the temple a better and more durable hinge than hitherto.

To enable the invention to be fully understood I will describe it by reference to the accompanying drawing, in which:—

Fig. 1 is a sectional rear view showing one lens and its supporting frame of a pair of spectacles constructed in accordance with the invention.

Fig. 2 is a sectional plan view of the parts shown in Fig. 1, the section being taken on the line 2—2 of the latter figure.

Fig. 3 is an elevation at right angles to Fig. 1 and

Fig. 4 is a view of a portion of Fig. 1 but showing the lens removed from its enclosing frame.

$a$ is one of the lenses of the spectacle, $a'$, is the peripheral notch therein, and $b$ is the enclosing frame of tortoise-shell or like material having the groove $c$ for the said lens. $d$ is one of the temples.

$i, i$, are the two separable sections or joint pieces forming the portion of the knuckle joint carried by the frame, $b$, to enable the latter to be opened to receive the lens, and between which the temple $d$ is hinged, the said sections being recessed at their outer ends to receive the hinge portion of the temple between them, and being secured together by the screws, $j, k$, upon the latter of which the said temple hinges. $l$ is the metallic plate which is inserted between the two sections, $i, i$, and projects between the recessed portions thereof, and is provided with holes to receive the screws, $j, k$, whereby it is held in position, and the latter of which forms the hinge-pin for the temple which is bifurcated to embrace the plate $l$. The said plate extends into the groove in the frame $b$, and engages the peripheral notch $a'$, in the lens $a$.

What I claim and desire to secure by Letters Patent is:—

1. In a pair of spectacles or the like, a lens frame, provided with separable members forming parts of a split knuckle joint, a plate member located between said separable members and having a portion extending inwardly with respect to the frame to engage a notch in the lens, and an integral portion extending outwardly from said frame and provided with a hinge pin aperture, means for uniting said separable members and said plate, a temple provided with a hinge member and a hinge pin extending through said hinge pin aperture of said plate and through the hinge member of the temple.

2. In a pair of spectacles or the like, a lens frame or rim provided with separable members forming part of a split knuckle joint, a notched lens in said frame, a plate member interposed between said separable members, having a portion projecting inwardly to engage the notch in the lens, a temple having bifurcated portions to embrace said plate, and a screw extending through said separable members, the bifurcated portions of said temple and said plate, and serving as a hinge pin for the temple.

3. In a pair of spectacles or the like, a lens frame or rim provided with separable members forming part of a split knuckle joint and recessed at their outer ends to receive the temple, a notched lens in said frame, a plate member interposed between said members, having a portion extending into the groove of the frame to engage the notch in the lens, and a portion extending between the recessed portions of the said separable members, a plurality of screws extending through said separable members and said plate, one of said screws extending through the recessed portions of the said separable members and said plate member and forming a hinge pin, and a temple provided with bifurcated portions embracing said plate, and provided with apertures for engaging said hinge pin.

4. In a pair of spectacles or the like, a lens frame provided with separable outwardly extending members, a plate member clamped between and secured to said separable members and having an integral portion provided with a hinge pin aperture, said separable members extending over the hinge pin aperture and said plate member, and a recess being provided between said plate member and an adjacent separable member, a temple having a hinge member adapted to engage said recess, and a hinge pin passing through said hinge member, and the hinge pin aperture of said plate member.

5. In a pair of spectacles or the like, a lens frame provided with separable outwardly extending members, a plate member clamped between and secured to said separable members and having an integral portion provided with a hinge pin aperture, a temple having a bifurcated hinge member for engaging said plate member, said separable members being recessed to accommodate the hinge member of the temple, and a hinge pin extending through said separable members, the hinge pin aperture of said plate member and the hinge member of the temple.

HARRY NEWBOLD.